United States Patent
Litzka

(10) Patent No.: US 6,983,998 B2
(45) Date of Patent: Jan. 10, 2006

(54) WHEEL COVER FOR COVERING THE RIM OF A VEHICLE WHEEL

(76) Inventor: Bernd Litzka, Malzgasse 4/5, Wein (AT) A-1020

( * ) Notice: Subject to any disclaimer, the term of this patent is extended or adjusted under 35 U.S.C. 154(b) by 53 days.

(21) Appl. No.: 10/398,494

(22) PCT Filed: Oct. 15, 2001

(86) PCT No.: PCT/AT01/00333

§ 371 (c)(1),
(2), (4) Date: Jul. 30, 2003

(87) PCT Pub. No.: WO02/32694

PCT Pub. Date: Apr. 25, 2002

(65) Prior Publication Data

US 2004/0100141 A1    May 27, 2004

(30) Foreign Application Priority Data

Oct. 17, 2000 (AT) .............................. A 1782/2000

(51) Int. Cl.
*B60B 7/20* (2006.01)
(52) U.S. Cl. .............................. 301/37.25; 301/37.371
(58) Field of Classification Search ............ 301/37.25, 301/37.371; 40/587
See application file for complete search history.

(56) References Cited

U.S. PATENT DOCUMENTS

| 2,130,220 | A | * | 9/1938 | Ball et al. ...................... 40/587 |
| 2,869,262 | A | * | 1/1959 | Lucas ........................... 40/587 |
| 3,722,958 | A | | 3/1973 | Marshall |
| 5,190,354 | A | * | 3/1993 | Levy et al. ............... 301/37.25 |
| 5,588,715 | A | * | 12/1996 | Harlen ..................... 301/37.25 |
| 5,659,989 | A | * | 8/1997 | Hsiao et al. .................. 40/587 |
| 6,048,036 | A | | 4/2000 | Alaoui |
| 6,120,104 | A | * | 9/2000 | Okamoto et al. ........ 301/37.25 |
| 6,471,302 | B1 | * | 10/2002 | Romijn ................... 301/37.25 |
| 6,517,167 | B2 | * | 2/2003 | Baker ...................... 301/37.25 |
| 6,637,831 | B1 | * | 10/2003 | Kim ........................ 301/37.25 |
| 2002/0125761 | A1 | * | 9/2002 | Matushita ................ 301/37.25 |

FOREIGN PATENT DOCUMENTS

EP    1 053 893    11/2000

OTHER PUBLICATIONS

Patent Abstracts of Japan; vol. 010, No. 081; Mar. 29, 1986; JP 60 222301 (Yutaka Matsushita); Nov. 6, 1985.

* cited by examiner

*Primary Examiner*—Russell D. Stormer
(74) *Attorney, Agent, or Firm*—Darby & Darby

(57) ABSTRACT

A rotatably mounted wheel cover disc for covering the wheel rims of vehicles has a hub element that is designed to accommodate a ball bearing and is directly fixed to the heads of the wheel bolts. Eccentrically and rotationally mounted weights on the wheel cover disc cause the wheel cover disc to remain horizontal at all times independently of the position or rotation of the axle part, whereby the positions of the weights line up in a self-balancing manner during the forced coupled rotation of the wheel cover disc.

10 Claims, 8 Drawing Sheets

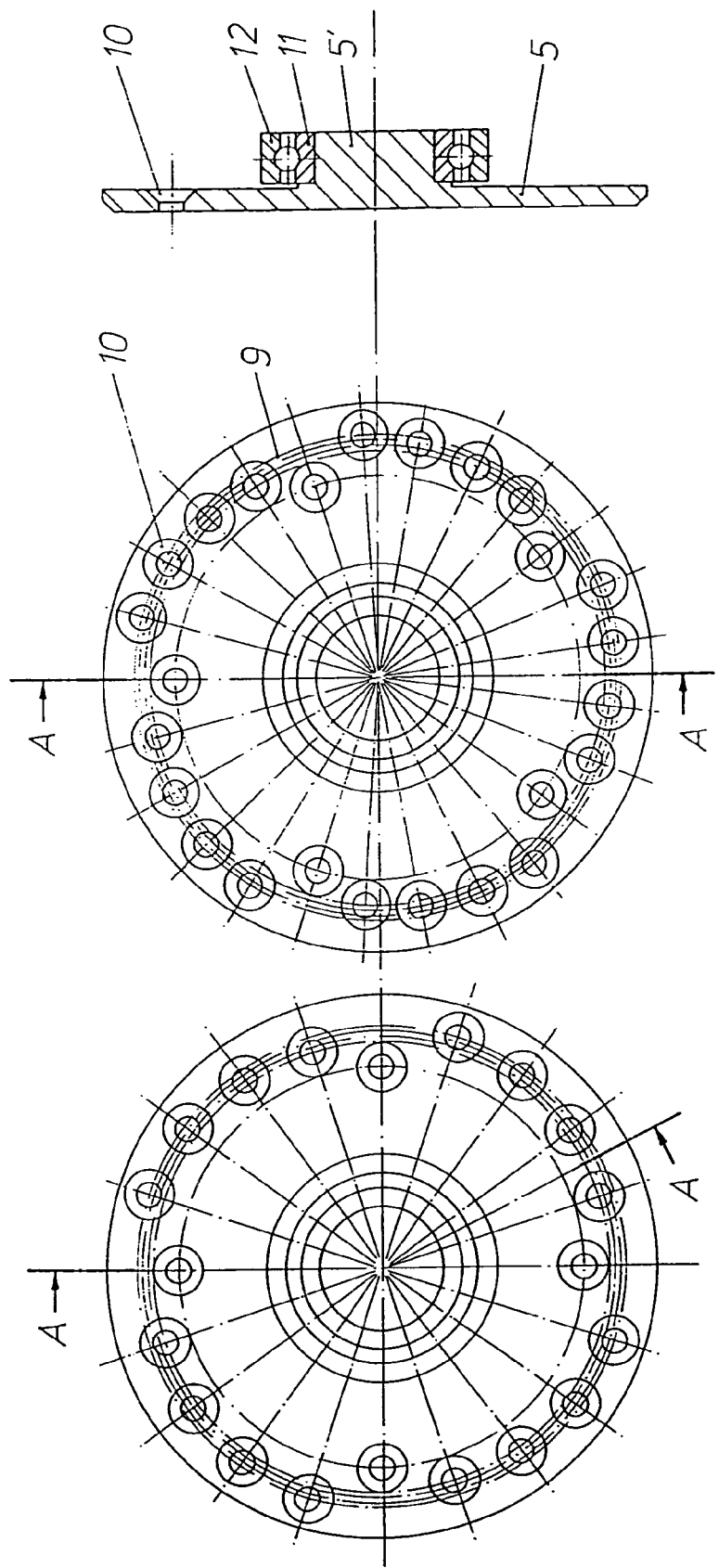

WHEEL COVER FOR COVERING THE RIM OF A VEHICLE WHEEL

CROSS REFERENCE TO PREVIOUS APPLICATION

This is a U.S. national phase application under 35 U.S.C. §371 of International Patent Application No. PCT/AT01/00333, filed Oct. 15, 2001, and claims the benefit of Austrian Patent Application No. A 1782/2000. filed Oct. 17, 2000 and Application No. A 1207/2001, filed Aug. 2, 2001. The International Application was published in German on Apr. 25, 2002 as WO 02/32694 A1 under PCT Article 21(2).

BACKGROUND OF THE INVENTION

The invention relates to a wheel cover for covering the rim of a vehicle wheel, including a carrier plate featuring a bearing hub connected to the rim, the rim in turn being attached to a wheel axle by means of wheel bolts; a ball bearing attached to the bearing hub, on the outer ring of which is fixed a mounting element that supports a wheel cover disc; and an eccentric weight connected to the wheel cover disc.

U.S. Pat. No. 5,190,354 A describes a wheel cover which, by means of a clasp-shaped fastener clamped between the wheel bolts and the wheel rim, supports a wheel hub element on which a wheel cover disc with a fixed-assembly weight is rotatably mounted. The entire construction is characterized by positive (locking) fasteners.

DE 298 14 332 U1 describes an aluminum non-rotating wheel cap with a special fastening device and battery-powered illumination. A fastener plate is clamped between the wheel bolts and wheel rim and supports a wheel hub on which an aluminum cap with a screwed-on weight is rotatably mounted.

DE 197 58 093 A1 describes a rotatably mounted emblem in the center of the rim that runs with a rigidly attached weight in an anti-freeze/water mixture.

DE 2 415 972 A1 describes a rotatably mounted wheel cover installed directly on a fixed axle. In addition to the installation directly on the axle journal of a wheel, a fixed-assembly eccentric weight is used here as well to achieve the stabilization in a horizontally aligned position.

WO 98-54005 A1 describes a wheel cover that uses a rotatably mounted weight to keep a section of the wheel cover in a horizontally aligned position. This invention is assembled using a radial pattern of clamp bolts on the inner perimeter of a rim.

GB 2 337 233 A describes a setup in which the horizontal alignment of the uncoupled wheel cap is achieved using a weight rigidly attached to the wheel cover disc. Mounting the wheel cover disc along with the weight in a sealed liquid bath is recommended.

EP 0 982 154 A2 describes a non-rotating wheel cap with generator-powered illumination from the rear of the wheel cover disc and a ventilation duct to allow the air stream to pass behind the wheel cover disc. Here too, the eccentric weight is rigidly attached to the wheel cover disc or carrier plate, and a clasp-like fastening clip on the rim is used for installation.

U.S. Pat. No. 5,490,342 A represents a wheel cover disc that is clamped in place on the outer edge of a rim and accommodates a centered, ball-bearing carrier plate for an eccentrically placed weight.

U.S. Pat. No. 4,280,293 describes a wheel cover disc characterized by a fixed-assembly eccentric weight and a liquid dampening of mercury or a similar fluid. The rotatable mounting is achieved by means of a hub element on which a ball bearing rests. The hub element is attached to a fixed wheel cap by a center bolt.

U.S. Pat. No. 5,659,989 describes several solutions for a non-rotating wheel cover disc. All variations feature a hub element that is either clamped in place on the rim edge or is bolted in place using holes drilled into the wheel rim for this purpose. Here too, the wheel cover disc is forced into a horizontal position by a ball bearing and a fixed-assembly weight.

U.S. Pat. No. 5,588,715 describes a non-rotating wheel cover disc featuring a carrier plate with a hub element through which, using a ball bearing, the wheel cover disc is forced into a horizontal position by a fixed weight. The carrier plate in this embodiment is installed in a centered recess behind the rim. The distinguishing feature of this assembly is that the carrier plate is pinched between the rim and the axle section or, in a second variation, is connected directly to the axle journal.

WO 00/09347 describes a non-rotating sealed wheel cap whose distinction is that the weight for horizontal alignment of the wheel cover disc is not directly attached, but can indirectly swing freely by means of a single-joint pendulum. Varying moments of inertia between the wheel cover disc and the weight thus effect a dampened excursion when accelerating or braking.

DE 41 01 726 A1 describes a wheel cap for trucks which is attached by means of a supporting and locking device to a ball bearing, which in turn is attached to a wheel hub axle. Here too, the carrier plate is installed between the wheel nuts and the rim. The weight for stabilizing the wheel cover disc is also rigidly attached to the wheel cover disc, but can shift radially when centrifugal forces cause a forced coupled rotation, thereby disengaging from the ball bearing and thus from the wheel rim as well.

U.S. Pat. No. 4,884,933 describes a clamping device for wheel bolt heads that is clamped tightly over the wheel bolt heads using an axially placed clamping bolt. This detachable connection is used for attaching non-skid devices for vehicle wheels in ice and snow.

The documents cited show that the hub elements, ball bearing and the wheel cover discs installed on them are all prior art. The current state of the art is the installation of the carrier plate between the wheel bolts and the rim or between the rim and the axle. The state of the art also includes the installation of weights with the wheel cover disc.

The problem that exists here is that unilateral unbalanced centrifugal forces occur during a forced coupled rotation of the wheel cover with the rim. The isolation of the wheel cover disc from the ball bearing or the pivoted unilateral mounting of the weight alone is not sufficient to solve the problem, since the wheel cover disc or the weight itself can undergo forced coupled rotation with the rim. The state of the art is also the installation of a mounting plate for non-skid devices, irrespective of the construction of the rim, by affixing a clamping mechanism over the wheel bolt heads.

OBJECT OF THE INVENTION

The objective of this invention is to minimize and eliminate unbalanced centrifugal forces that may occur during the forced coupled rotation of the wheel cover disc, and to attach the wheel cover to the rim in a manner that prevents loss or theft. An additional objective of this invention is the installation of the carrier plate or the hub element, regardless of the rim design, in such a way that the unit's width is minimized and the wheel cover disc extends in the axial direction only minimally or not at all beyond the rubber tire.

SUMMARY OF THE INVENTION

To meet the foregoing objective, the invention proposes to provide the carrier plate with a detachable connection to the wheel bolt heads and to mount two eccentric weights along the interior side of the wheel cover disc facing the carrier plate and mounted in a way that allows them to swivel in a circumferential direction, the swivel axis of the one eccentric weight being diametrically opposed to the swivel axis of the other eccentric weight at the same distance from the rotational axis of the wheel.

A further distinguishing feature of the invention is the connection of the carrier plate to cap-shaped clamping devices which—positively or non-positively, respectively—fit over and attach to the wheel bolt heads. An alternate embodiment of the invention provides for threaded bores in the wheel bolt heads that accommodate connecting bolts for fastening the carrier plate.

As a result of the inventive installation of the wheel cover over the wheel bolt heads, the installation is not dependent on the design of the rim, an optimum heat transfer to the wheel cover disc is achieved and rear ventilation of the wheel cover disc is enabled, counteracting the heating of the brakes. Moreover, the connection between a vehicle's wheel rim and wheel bolts is not altered, so that neither the behavior of the brakes nor the vehicle performance is affected.

The elimination of unbalanced centrifugal forces of the weight during a coupled rotation of the wheel cover disc is achieved through the specially designed, eccentrically and rotatably mounted weights that self-balance in the event of a coupled rotation of the wheel cover disc.

Another distinctive feature of the invention is that the carrier plate has symmetrical holes—placed on concentric hole circles, preferably as countersunk holes—designed to accommodate the connecting bolts.

In another embodiment of the invention, the mounting element that supports the wheel cover disc is a positive or non-positive clamping ring element or fixed housing ring on the outer ring of the ball bearing.

The inventive connection of the wheel cover disc and the clamping ring element to the ball bearing ensures not only a vibration-safe connection but also the especially thin dimensions of the embodiment, which is why installation is possible on all commercially available wheel rims and the wheel cover disc extends only minimally or not at all beyond the tire's bulge in the axial direction.

The invention is also constituted by the eccentric weight's shape as a flat segment of a circle. In another embodiment of the invention, each of the circle segment-like flat pieces displays a recess along its circle perimeter section. In another embodiment of the invention, this recess interacts with a guiding element on the interior side of the wheel cover disc facing the carrier plate.

A further embodiment of the invention is that the two opposite eccentric weights are pulled together by a tension spring so as to eliminate vibrations and influence the swivel properties of the wheel cover disc and the weights such that, under normal operating conditions, the wheel cover does not rotate together with the rim, but after a coupled rotation of wheel cover is forced and the rotational velocity of the wheel cover disc is reduced, the weights align themselves back to the eccentric position.

The rotatably, eccentrically placed mounting element of the eccentric weights causes the weights to pivot out, and in their extended position to be aligned such that the weights' centrifugal forces from the rotation of the wheel cover disc cancel each other out and extend the tension spring, ensuring a balanced coupled rotation of the wheel cover disc with the axle.

In another embodiment of the invention, the eccentric weights, in their idle position, abut along their inward-facing edges to a dampening element situated on the interior side of the wheel cover disc. This effectively dampens a jolt caused by a collision of the two eccentric weights when reverting to their original position.

The wheel cover of this invention is further characterized by two end stops on the side of the wheel cover disc facing the wheel rim that limit the pivoting motion of the eccentric weights. The end stops are arranged symmetrically on the interior side of the wheel cover disc so as to limit the excursion of the eccentric weights during forced coupled rotation.

In another embodiment of the invention, the two eccentric weights are drawn together in the area facing the dampening element and separated from the rotational axis of the wheel by a tension spring acting upon one eccentric weight.

BRIEF DESCRIPTION OF THE DRAWINGS

The invention is illustrated in greater detail by the following diagrams, wherein FIG. 1 shows the carrier plate of the inventive wheel cover in a sectional view along line A—A of FIGS. 2 and 3, FIGS. 2 and 3 each show a top view of a carrier plate.

DETAILED DESCRIPTION OF THE INVENTION

Figure 8:
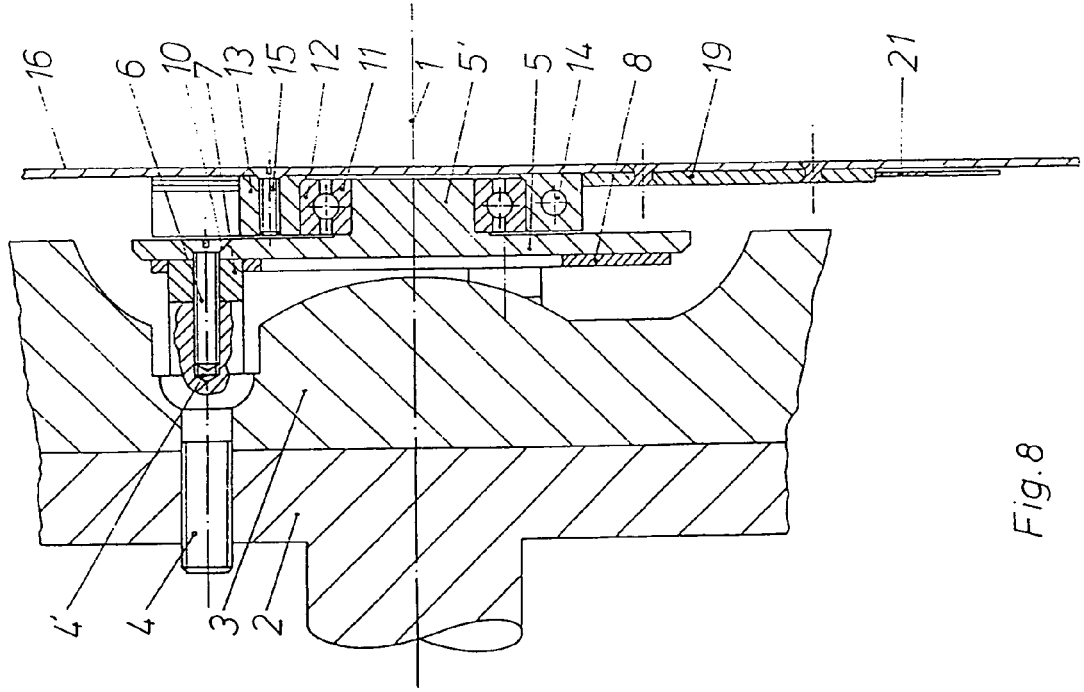
FIG. 8 shows a sectional view along line D—D from FIG. 7 of the wheel cover installed on a wheel rim as specified by the invention.

FIG. 8 shows the construction of a wheel cover as specified in the invention arranged frontally on a rotational axis 1 of a wheel. On axle section 2, wheel rim 3 is installed with wheel bolts 4, each of whose bolt heads features a centered threaded bore 4'. The threaded bores 4' of wheel bolts 4 are designed to accommodate carrier plate 5 supporting bearing hub 5' (FIGS. 1, 2, 3). The connection of carrier plate 5 to wheel rim 3 is achieved with bolts 6, which are fastened in the bore holes 4' intended for the wheel bolt heads of bolts 4.

Figure 13:
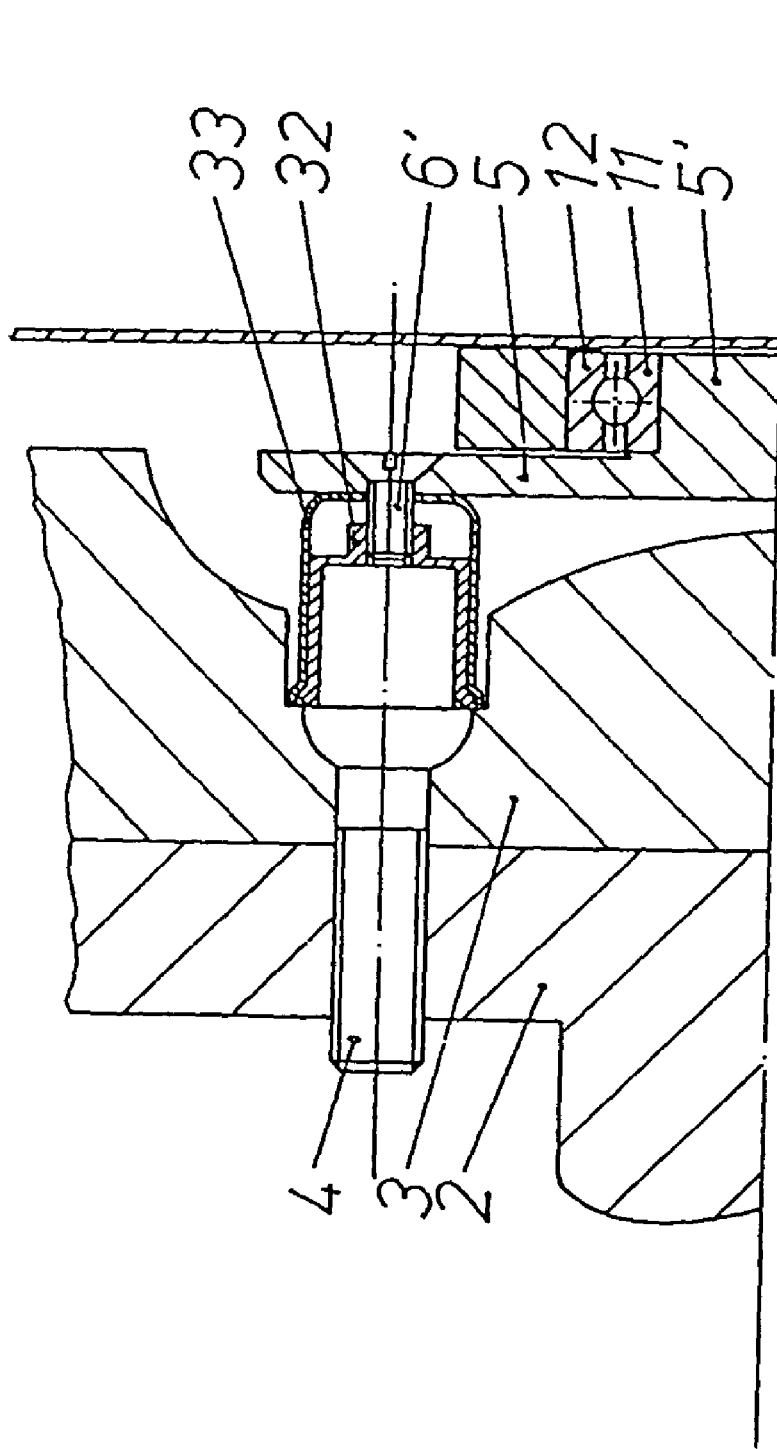
FIG. 13 shows a sectional view of a different embodiment model of the installation from that shown in FIG. 8.

FIG. 13 shows another embodiment of the invention featuring clamping devices 32, 33 affixed atop the heads of wheel bolts 4 by bolts 6', representing a connection of carrier plate 5 to wheel rim 3. Clamping device 32 is connected frontally to carrier plate 5' by means of bolt 6'.

The clamping device consists of a cap-like element 32, abutting directly to the head of wheel bolt 4, and whose surface is slotted. The surface's edge is bent outward, and the inner side facing the head of wheel bolt 4 features anti-slip profiling. A cup-shaped sleeve 33 fitting over the cap-like element 32 shifts over the outwardly-bent edge of the cap-like element 32 when bolt 6' is tightened and thus fastens the clamping device to the head of wheel bolt 4.

Figure 7:
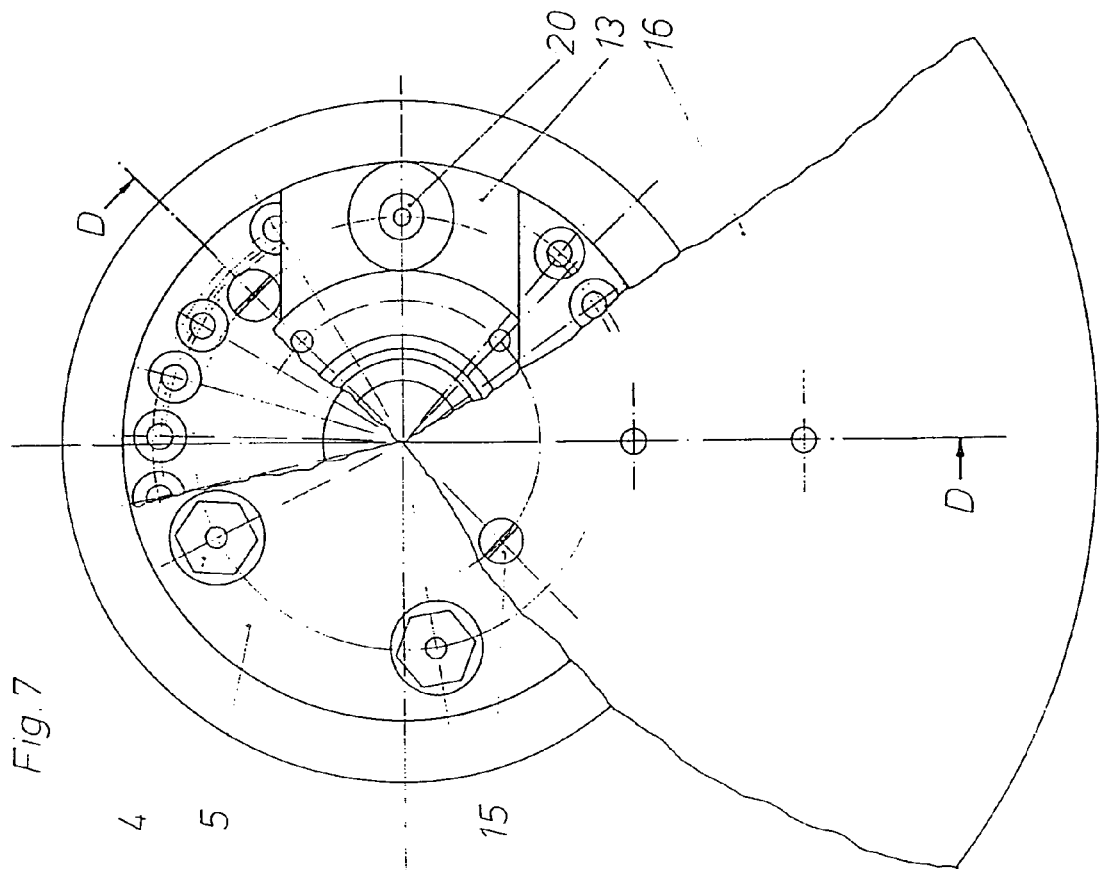
FIG. 7 represents a cut-away top view of the wheel cover installed on a wheel rim as specified by the invention.
Figure 11:
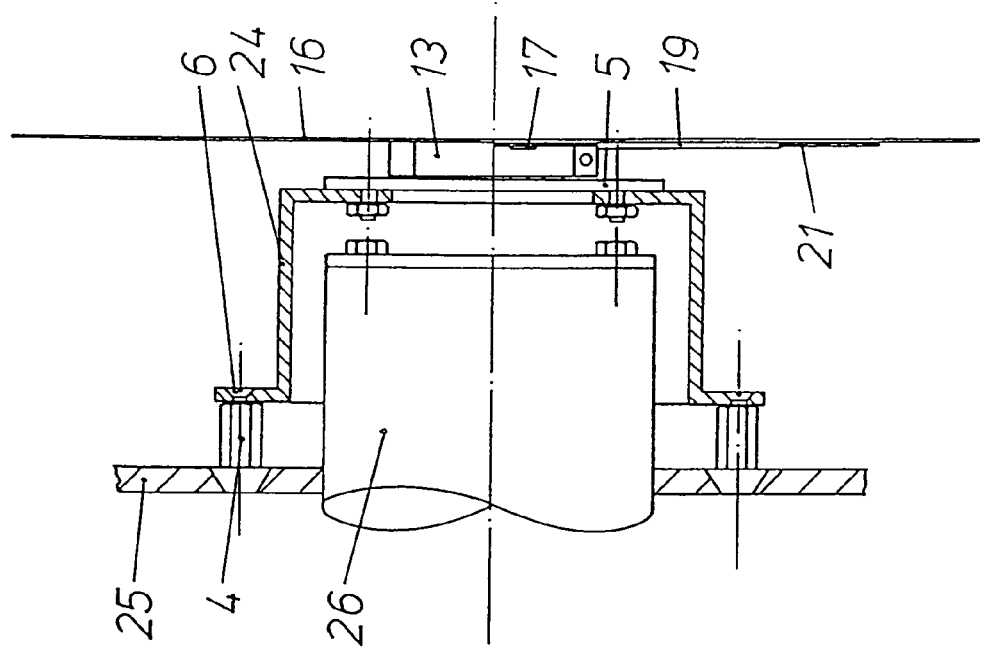
FIG. 11 shows a sectional view from another embodiment model of the installation of the inventive wheel cover.

Here, spacers 7, which may be placed in a hole circle shape on a ring 8, function as distancing elements. The spacers 7 are optional components of the wheel cover to facilitate adjustment to commercially available wheel rims 3 (FIGS. 7, 8, 13). For special-design wheel rims 25, e.g. on trucks or off-road vehicles, with a protruding axle section 26 or a large distance between the wheel cover disc and the wheel bolt heads, it is better to fasten carrier plate 5 using a preferably hat-shaped distance piece 24 (FIG. 11) or longer spacers 7.

Figure 4:
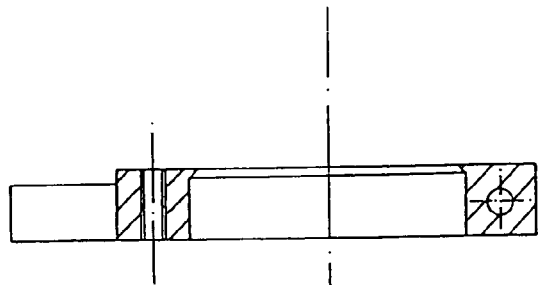
FIG. 4 shows a sectional view along line B—B from FIG. 5 of the clamping ring element of the inventive wheel cover.
Figure 5:
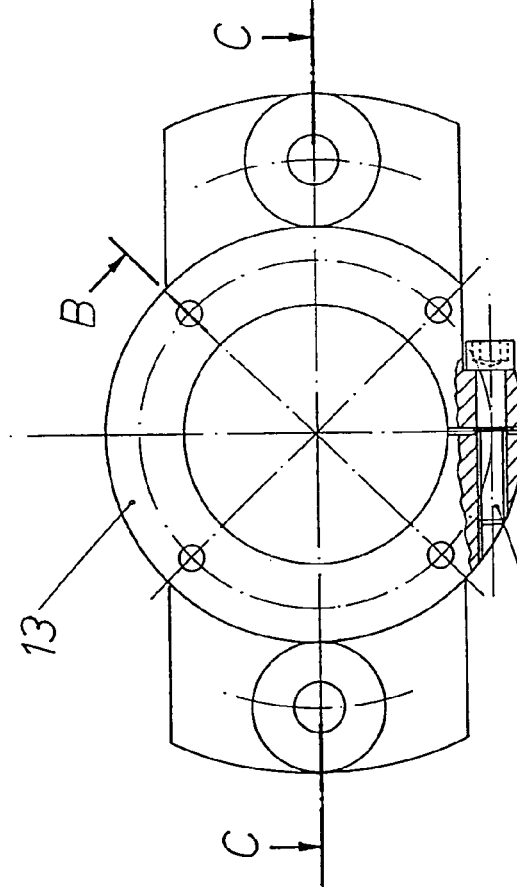
FIG. 5 shows the top view of a clamping ring element of the inventive wheel cover.
Figure 6:
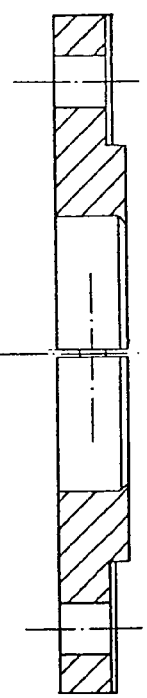
FIG. 6 shows a sectional view along line C—C from FIG. 5 of the clamping ring element.

Carrier plate 5 features symmetrical countersunk holes 10 placed on hole circles 9 to accommodate connecting bolts 6 (FIGS. 2, 3). A ball bearing is placed on bearing hub 5' of carrier plate 5, and inner ring 11 is fixed positively or non-positively on bearing hub 5'. On the outer ring 12 of the ball bearing rests a clamping ring element 13. The clamping ring element 13 is fastened non-positively with a clamping bolt 14 (FIGS. 5, 6) on the outer ring 12 of the ball bearing. In another embodiment of the invention (FIG. 12), a housing ring 13' is fastened positively or non-positively on the outer ring 12 of the ball bearing.

The clamping ring element 13 accommodates a wheel cover disc 16 using bolts 15, which are developed as safety bolts in another embodiment of the invention. Wheel cover disc 16, on the side facing away from the wheel rim 3, functions as a display area for optical designs, which remain legible and more or less stationary even when the axle section 2 is rotating.

Figure 9:
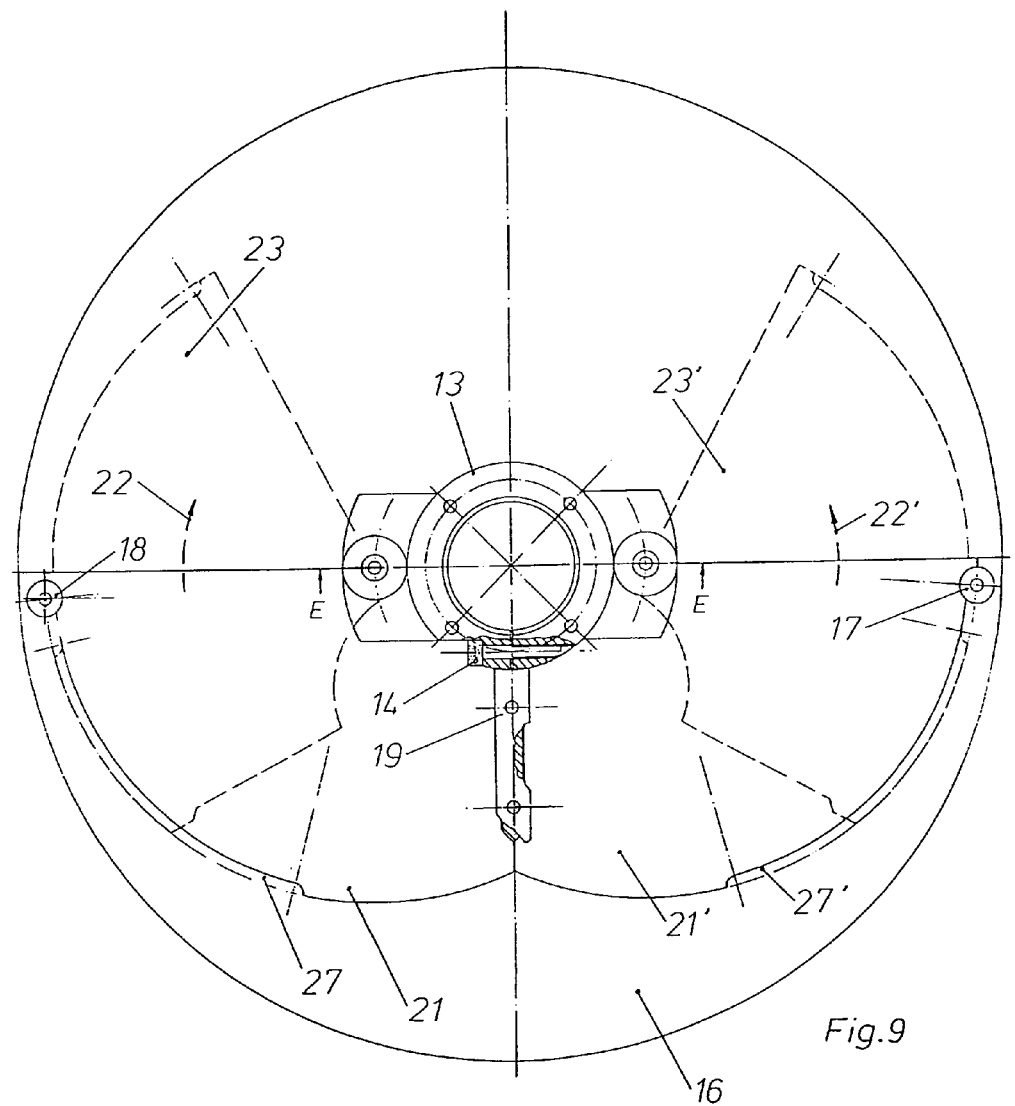
FIG. 9 shows a rear view of the wheel cover disc with the eccentric weights in place and the clamping ring affixed.
Figure 10:
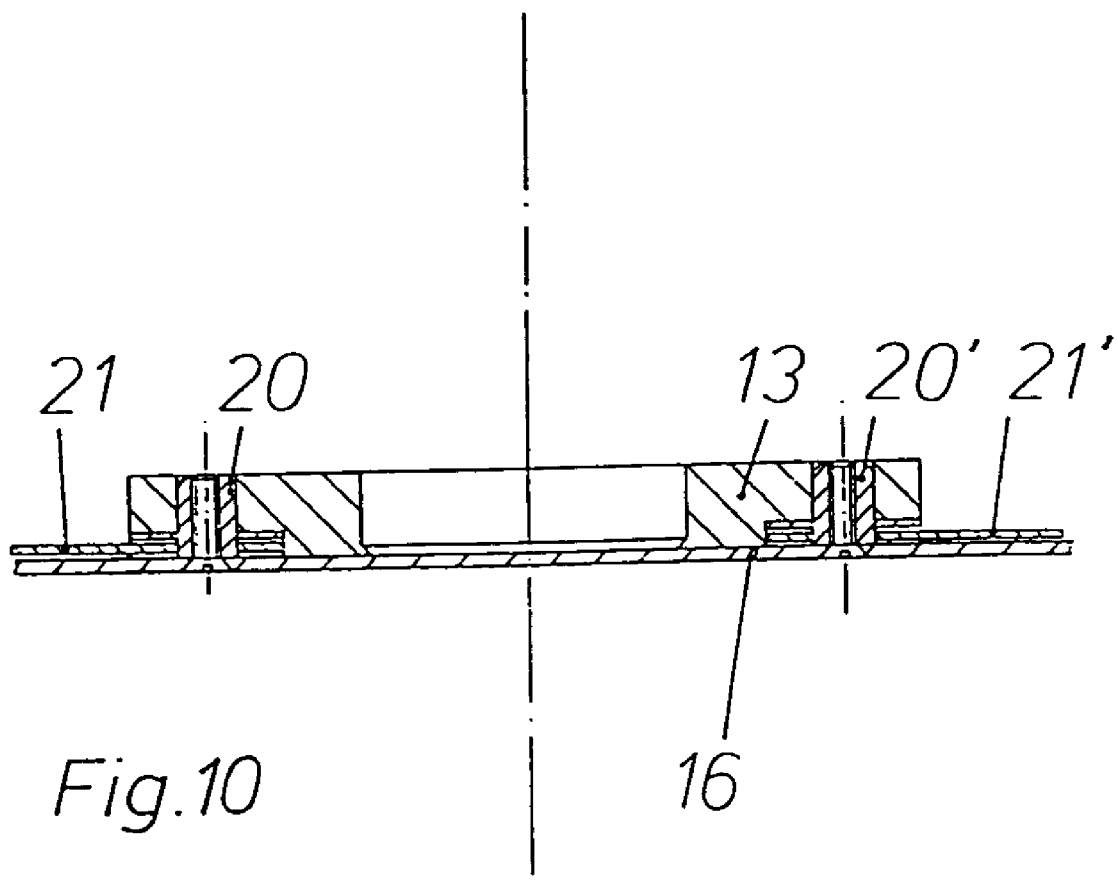
FIG. 10 shows a sectional view along line E—E from FIG. 9.

FIG. 9 shows that guide elements 17 and 18 as well as guide/dampening element 19 are attached to the side of wheel cover disc 16 that faces wheel rim 3. Dampening element 19 is designed as a shock-absorbing buffer against which eccentric weights 21, 21' developed as flat pieces shaped as circle segments from sheet metal, for example abut when in their idle position. Weights 21, 21' feature formed recesses 27, 27' along the circular perimeter section (FIG. 9), along which weights 21, 21' can shift freely over guide elements 17 and 18. To keep the wheel cover disc 16 in a stable, horizontally aligned position, the symmetrically, eccentrically placed weights 21, 21' are rotatably mounted over the axes 20, 20' (FIG. 9), which are attached rigidly to the wheel cover disc 16 (FIG. 10). Axes 20, 20' are constructed such that they function as guide bolts when installing the wheel cover disc 16 with the clamping ring element 13.

Figure 12:
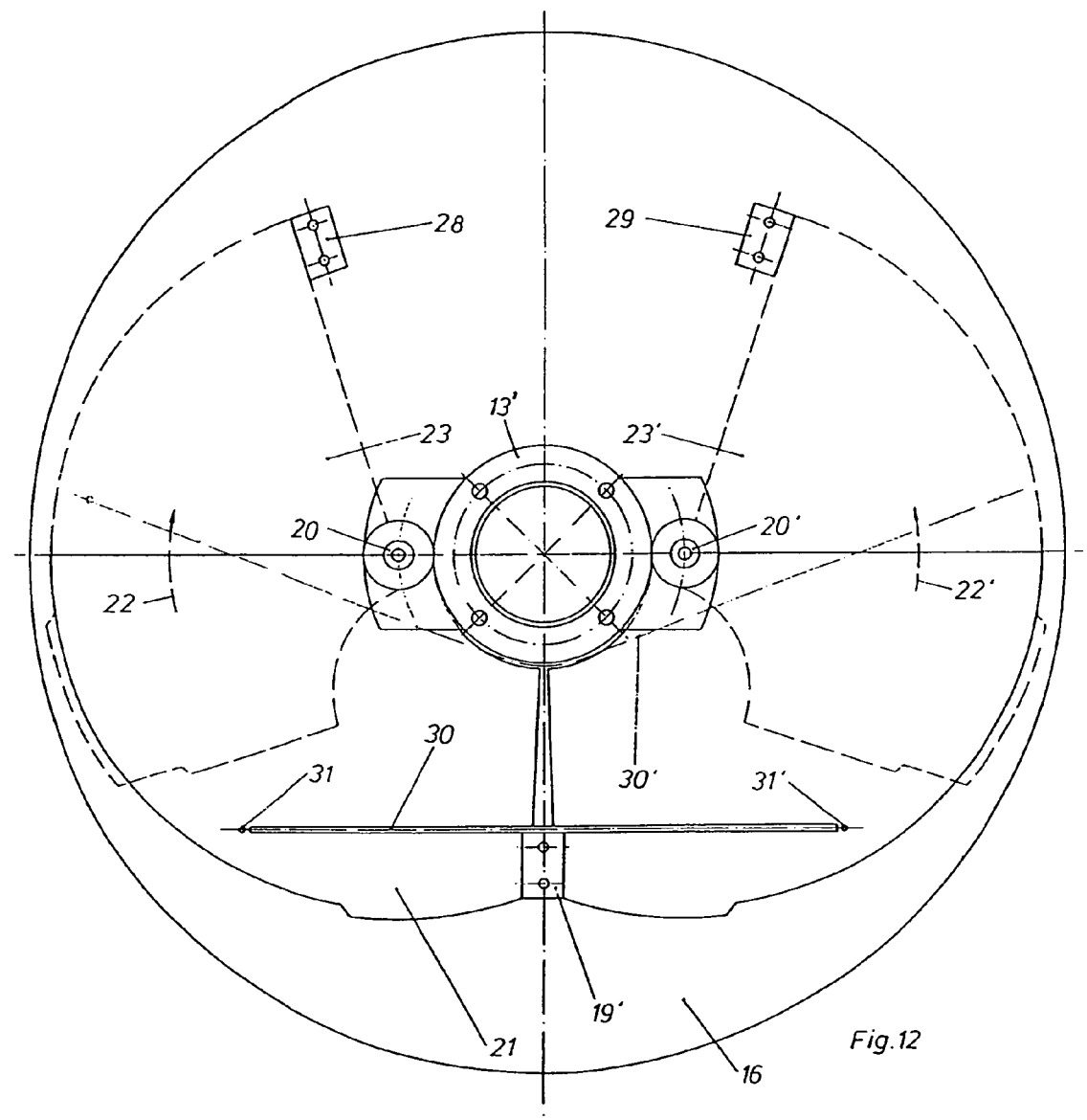
FIG. 12 shows a rear view of the wheel cover disc with the eccentric weights in place in a different embodiment than FIG. 9.

FIG. 12 shows another embodiment of the invention in which dampening element 19' and two end stops 28 and 29 that limit the swivel motion of the eccentric weights 21, 21' are attached to the side of the wheel cover disc 16 that faces the wheel rim 3. Dampening element 19' is designed as a shock-absorbing buffer against which eccentric weights 21, 21' developed as flat pieces shaped as circle segments from sheet metal, for example, and pulled together by a tension spring 30 over clips 31, 31' abut when in their idle position. End stops 28 and 29 are placed so as to limit the excursion of the symmetrically, eccentrically placed weights in their pivoting along the arrows of rotational direction 22, 22' to position 23 and 23' and the stretching of the tension spring 30 to position 30'.

The rotatable, eccentrically placed bearing of the weights 21, 21' causes them to swivel out in the direction of the rotational direction arrows 22, 22' of weights 21, 21' as well the tension spring 30 to stretch toward position 30' during the externally forced coupled rotation of the wheel cover disc 16 with wheel rim 3. When swiveled out to position 23, 23', the weights are aligned such that the centrifugal forces of weights 21, 21' that arise from the rotation of the wheel cover disc 16 cancel each other out and permit a balanced coupled rotation of the wheel cover disc 16 with the axle section 2.

The carrier plate is installed by fastening of connecting bolts into threaded holes which are to be made in the wheel bolt heads. In another embodiment, the carrier plate is installed by affixing clamping devices over the wheel bolt heads and fastening the carrier plate by means of connecting bolts into threaded holes in the clamping device.

The invention is claimed:

1. A wheel cover for covering a rim of a vehicle wheel, comprising a carrier plate with a bearing hub, said bearing hub being connected to the rim, and the rim in turn being attached to a wheel axle by means of wheel bolts having wheel bolt heads; also comprising a ball bearing attached to the bearing hub, and a mounting element fixed on an outer ring of the ball bearing, said mounting element supporting a wheel cover disc; and further comprising a pair of eccentric weights (21, 21') connected to the wheel cover disc; wherein the carrier plate (5) is detachably connected to the wheel bolt heads and the two eccentric weights (21, 21') are mounted on an interior side of the wheel cover disc (16) that faces the carrier plate (5) in such a manner that the eccentric weights swivel in a circumferential direction, and wherein the eccentric weights (21, 21') have swivel axes (20, 20') arranged in diametric opposition at equal distances from a rotational axis (1) of the wheel.

2. The wheel cover according to claim 1, wherein the carrier plate (5) is connected with cap shaped clamping devices (32, 33) respectively fit over and attach to the wheel bolt heads.

3. The wheel cover according to claim 1, wherein threaded bores (4') are arranged in the heads of the wheel bolts (4) and wherein the carrier plate (5) is fastened by means of connecting bolts (6) into the threaded bores (4') of the wheel bolts (4).

4. The wheel cover according to claim 3, wherein the carrier plate (5) has symmetrical holes placed on concentric hole circles (9) designed to accommodate the connecting bolts (6).

5. The wheel cover according to claim 1, wherein the mounting element supporting the wheel cover disc (16) is a clamping ring element (13) or a housing ring (13') attached to the outer ring (12) of the ball bearing.

6. The wheel cover according to claim 1, wherein the eccentric weights (21, 21') are arcuate flat pieces.

7. The wheel cover according to claim 4 wherein each arcuate flat piece (21, 21') features a recess (27) on a circular perimeter section interacting with a guide element (17, 18) placed on the interior side of the wheel cover disc (16) that faces the carrier plate (5).

8. The wheel cover according to claim 1, wherein the eccentric weights (21, 21'), in positions, abut along their inward-facing edges to a dampening element (19, 19') situated on the interior side of the wheel cover disc (16).

9. The wheel cover according to claim 1, wherein two end stops (28, 29) that limit the swivel motion of the eccentric weights (21, 21') are attached to the side of the wheel cover disc (16) that faces the wheel rim (3).

10. The wheel cover according to claim 6, wherein the two eccentric weights (21, 21') are drawn together in the area facing the dampening element (19') and separated from the rotational axis (1) of the wheel by a tension spring (30) acting upon one eccentric weight (21, 21').

* * * * *

UNITED STATES PATENT AND TRADEMARK OFFICE
CERTIFICATE OF CORRECTION

| | | |
|---|---|---|
| PATENT NO. | : 6,983,998 B2 | Page 1 of 1 |
| APPLICATION NO. | : 10/398494 | |
| DATED | : January 10, 2006 | |
| INVENTOR(S) | : Bemd Litzka | |

It is certified that error appears in the above-identified patent and that said Letters Patent is hereby corrected as shown below:

On the Title Page:

Item (86); Please delete "July 30, 2003" and substitute -- June 24, 2003 --.

Item (30); The $2^{nd}$ Foreign Application Priority Data has been omitted. Please insert -- August 2, 2001   (AT)   ……………….. A 1207/2001 --.

Signed and Sealed this

Twenty-second Day of August, 2006

JON W. DUDAS
*Director of the United States Patent and Trademark Office*